(12) United States Patent
Cretti et al.

(10) Patent No.: US 6,549,596 B1
(45) Date of Patent: Apr. 15, 2003

(54) FULLY DIGITAL PHASE ALIGNER

(75) Inventors: Franceso Cretti, Milan (IT); Nuccio Villa, Roncello (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 09/392,898

(22) Filed: Sep. 9, 1999

(30) Foreign Application Priority Data

Sep. 17, 1998 (EP) ............................................ 98830542

(51) Int. Cl.⁷ ................................................ H03D 3/24
(52) U.S. Cl. ...................... 375/373; 375/376; 375/333; 375/327
(58) Field of Search ................................ 375/376, 333, 375/327, 373

(56) References Cited

U.S. PATENT DOCUMENTS

| | | | |
|---|---|---|---|
| 4,789,996 A | 12/1988 | Butcher | 375/120 |
| 4,808,884 A | 2/1989 | Hull et al. | 375/120 |
| 4,847,870 A | 7/1989 | Butcher | 375/87 |
| 5,487,095 A * | 1/1996 | Jordan et al. | 375/371 |
| 5,757,297 A * | 5/1998 | Ferraiolo et al. | 341/100 |

FOREIGN PATENT DOCUMENTS

EP          0 639 004 A1    7/1994    ..................... 5/135

\* cited by examiner

*Primary Examiner*—Stephen Chin
*Assistant Examiner*—Guillermo Munoz
(74) *Attorney, Agent, or Firm*—Allen, Dyer, Doppelt Milbrath & Gilchrist, P.A.; Lisa K. Jorgenson

(57) ABSTRACT

A fully digital phase aligner includes a control loop acting upon a delay line comprising at least a cascade of delay cells, each cell being individually configurable to produce one of two selectable propagation delays as a function of the logic state of a respective digital control signal. This is done by way of a shift register including a number of latches equal to the number of the cells of the delay line. An output tap of each latch of the shift register controls a respective delay cell of the delay line. A digital state machine in the control loop prevents any undesired oscillations.

32 Claims, 14 Drawing Sheets

DIGITAL FILTER WAIT TIME INSERTION

FULLY DIGITAL PHASE ALIGNER

FIELD OF THE INVENTION

The invention relates to the field of digital transmissions, and, more particularly, to a technique of clock alignment in a data receiver.

BACKGROUND OF THE INVENTION

In a digital transmission system, information bits electrically coded with voltage or current levels to represent the basic information of "1" and "0" are transmitted sequentially in the form of a serial stream of bits. The receiver may receive a clock together with the data, and generate locally a replica of the transmitter clock or recover a clock from the incoming data. In all cases the receiver clock is preferably centered in the middle of the data pulse, and this condition should be maintained during operations.

According to a prior art clock recovery technique, a clock signal is extracted from a data stream using spectral information on the period of the received stream of bits. Many of these known approaches are able to align the recovered clock to the center point of the data pulses. However, these approaches may also have many drawbacks and constraints that limit their usage.

The advantages include: the receiver generates its own clock without any external clock generation (no need of expensive components to distribute clocks through the system), and the alignment between data and clock may be precisely controlled.

The disadvantages include: receivers are preferably realized in simple and fast CMOS technology, conceived for digital design and thus unsuitable for the implementation of clock recovery schemes, usually realized with analog structures; high sensibility to noise, especially when implemented in digital ASIC technology; and too slow for today's state-of-the-art applications.

To reduce the complexity of the receivers, the alternative approach is that of generating the clock independently from the data within the receiver. This is done in the form of a precise replica of the transmission clock by using stable quartz oscillators or PLLs. Most typically, the alignment of a locally generated clock with the data is performed by feedback loops. The control loop monitors continuously the actual relative positions of the clock and data edges (fronts), and controls an array of delay elements for adjusting their relative position. Since the relative time or temporal position is important, it is irrelevant to shift the phase of the data pulses with respect to a fixed clock or vice versa.

Analog circuitry, as normally employed for implementing such control loops of clock aligners (also referred to as phase aligners), may ensure the alignment of a clock with an incoming asynchronous stream of digital data, but imposes tight constraints on the environment of the chip in which the analog circuitry is embedded. It may happen that an analog circuit that behaves well in an isolated environment becomes completely erratic when working near digital circuitry that causes injection of switching noise into susceptible parts of the analog circuit. A design goal is to keep the analog circuit isolated as much as possible from the noisy digital sectors. This problem becomes even more acute when analog parts are embedded in a digital CMOS chip, because it is extremely difficult to ensure a complete isolation between the analog part and the noisy digital parts in a normal CMOS fabrication process.

A practical analog phase aligner may be more precisely illustrated by the diagram of FIG. 1. The delay line represents the means for adjusting the phase delay between data and data synch. The phase detector is a block that compares the phase differences between clock and data synch. The loop filter is typically a low pass filter that is necessarily introduced to avoid unwanted oscillation in the feedback loop. The delay line control block adjusts the delay introduced by the delay line as a function of the filtered output of the phase detector. Typically this block performs only buffering and/or amplifying functions. In the example of FIG. 1, the phase of the data is changed in relation to the phase of the clock that is kept fixed.

A delay line usually comprises one or more variable delay stages in cascade. The propagation delay that is introduced by each delay cell can be varied continuously within a certain range through an analog control signal coming from the delay line control block. Many different implementations of variable delay cells are possible, but all of them share the concept that the delay cell is essentially an analog controlled stage. The delay of propagation of which may be varied continuously by way of an analog control signal.

A phase comparator outputs a current pulse whose amplitude is proportional to the phase difference between the edges of the data and those of the clock. This pulse is fed to a low pass filter that integrates the currents going back and forth from the phase comparator and whose output is an analog voltage proportional to the net current input to the filter.

As new applications tend to satisfy the incessant demand of broader bandwidth in digital communications for faster and greater numbers of transmission links, the limitations of the analog approaches become more evident. Analog approaches are always critical and are not easily expandable as the working frequency increases. Typically, analog approaches are custom approaches and are therefore difficult to reuse. In contrast, apparatus manufacturers are looking for approaches that can be moved from one design to another with minor changes that should not imply a complete redesign.

For each data link, a phase aligner is needed. As the number of links increases the embedding of more and more analog blocks may seriously reduce the yield of an ASIC. For example, a switch matrix for data communication for 16 links requires 16 analog blocks and in next generation products the number of the links is expected to grow up to 32 or 64. Embedding so many modules or analog circuit portions, while carefully avoiding any interference between them and the digital parts, becomes very difficult.

A way to avoid analog design complexity is to realize a loop based on the use of a plurality of selectable clock phases, according to the modified block diagram of FIG. 2. According to this known approach, a system clock is split in N phases equally spaced from each other by 360 degrees/N.

According to this control loop, the role of the phase detector becomes that of discriminating whether the current clock phase leads or lags the data edge and consequently choose the next or the previous clock phase so that the phase shift between the current clock phase and the data is kept low and less than(360/N)/2. The phase detector can be designed as a fully digital block, because it merely generates a flag to indicate if the edge of the clock comes before or after the edge of the data.

In these known phase aligners, the phase shift between the data and clock signals may be compensated only by choosing among a certain number of purposely generated different clock phases. The whole aligner system may be digital to avoid the problems associated with the integration of analog circuitry, but a major burden is represented by the need to integrate the circuits for generating and distributing N-clock phases on the chip.

Other approaches to clock recovery and clock alignment are based on sampling the data stream with a high frequency sampling signal and on monitoring the resulting logic sequences to verify and eventually adjust the period of the generated clock. However these techniques, though eliminating the need for any analog circuitry, are applicable only to relatively low speed (bit rates) links. They are unsuitable for the high speeds of state-of-the-art communication links.

An all-digital clock recovery and alignment system of this kind, is described in the European Patent Application No. 97830644.7 filed on Apr. 12, 1997, assigned to the assignee of the present invention.

It is evident of the need and/or usefulness of a digital clock alignment system suitable for the highest speed of state-of-the-art communication links (at present in the vicinity of 622 Mb/sec) that does not require the generation and distribution on the chip of a relatively large number of clock phases. Such a system is also relatively simple and readily integrated based upon a design which lends itself to be readily scaleable for future technological advances and transferable from project to project.

SUMMARY OF THE INVENTION

The main object of this invention is to provide a digital clock alignment system suitable to applications where there are many high bit rate links asynchronous with respect to a received clock. For example, when transmitting data at 622 Mb/s the duration of a valid data pulse is nominally 1.6 ns and the receiver's clock must have its rising edge centered with respect to the data. In real cases, the "eye" or useful temporal window for correctly sampling the data is much narrower then the nominal duration of a data pulse of 1.6 ns. The alignment system may need to be duplicated for up to 20 or more links in a single IC in which the noise is expected to be a possible factor.

Under these limit conditions, a reliable analog module could hardly be accommodated 20 times on the chip. Even a system of the prior art, employing multiple clock phases would require relatively complex circuitry with an excessive area requirement.

All these difficulties of the known techniques are overcome by the system of the present invention which is based on a clock phase aligner in the form of a classical control loop of a delay line, to an input of which an incoming data stream is fed, wherein noise sensitivity and a large area requiring analog stages are no longer present, and wherein the anti-oscillatory or stabilizing function that in known systems is performed by a low pass loop filter, is performed by a digital state machine that checks logically any oscillatory behavior of the fully digital control loop of the system of the invention.

According to the invention, the delay line comprises a cascade of digital delay cells, each individual cell being able to assume two distinct configurations producing two selectable different delays of propagation. Each cell is controlled by the tap (output) of a respective one of the latches that make up a shift register which is fed with the signals output by a control logic circuit. The control logic circuit processes the flag signals output by a phase detector that discriminates on whether a data edge leads or lags the edge of a clock signal.

The control logic, besides preventing oscillations in the control loop, most preferably also provides a priority determining algorithm for enhancing the performance of the fully digital control loop of the clock aligning system of the invention, as will be described more in detail later.

Yet another embodiment contemplates a duplication of the digital control loop and the use of an arbiter circuit for switching from one to the other for extending the range of phase shift that may be compensated in high frequency applications.

BRIEF DESCRIPTION OF THE DRAWINGS

The different features and advantages of the system of the invention will be more readily understood through the following detailed description of the circuits that compose the control loop of the phase aligning system of the invention and by referring to the attached drawings containing the following.

DETAILED DESCRIPTION OF THE PREFERRED EMBODIMENTS

Figure 1:
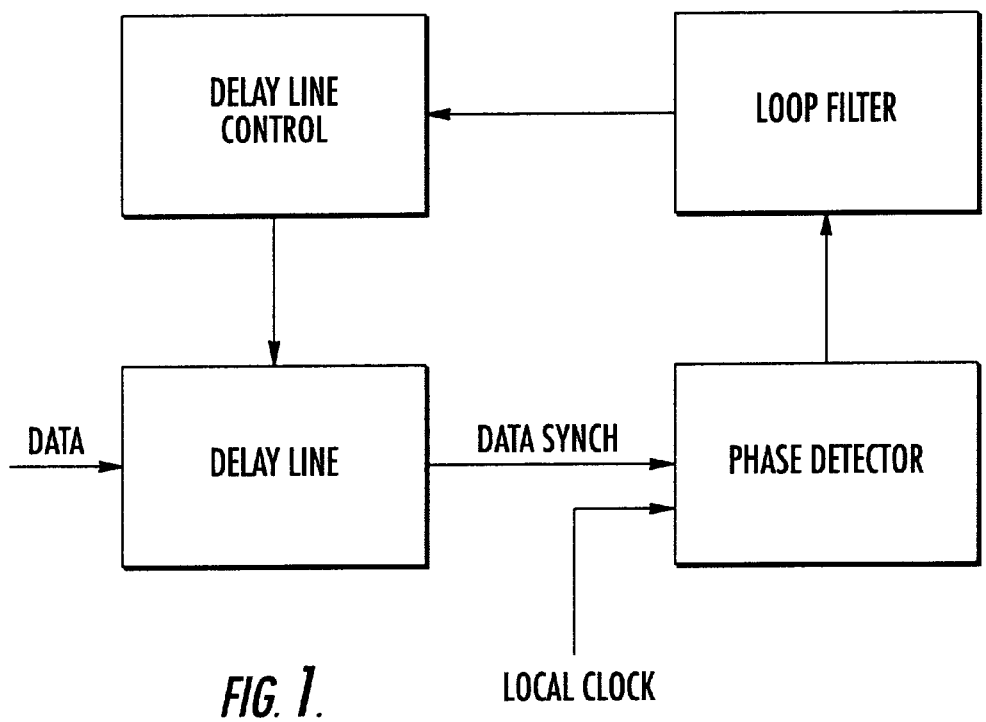
FIG. 1 is a basic diagram of a clock alignment loop as in the prior art.
Figure 2:
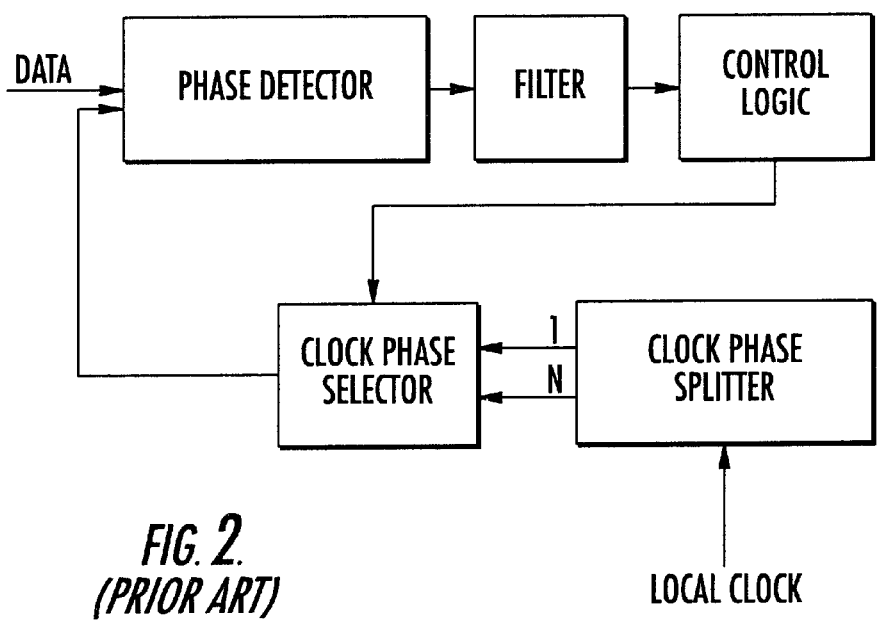
FIG. 2 is a basic diagram of a digital multiple clock phase aligner as in the prior art.
Figure 3:
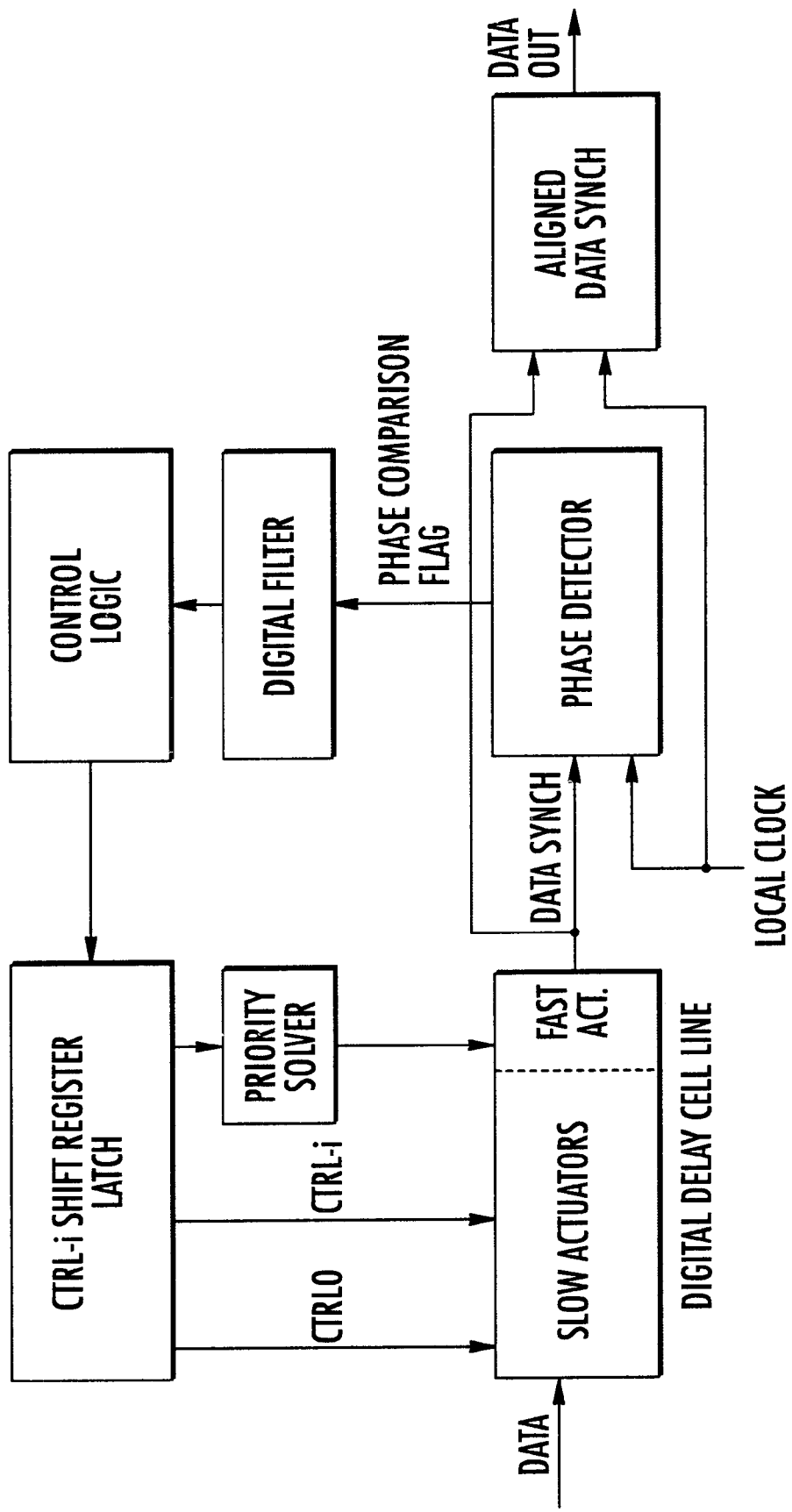
FIG. 3 is a basic diagram of a fully digital phase aligner of the invention.
Figure 4:
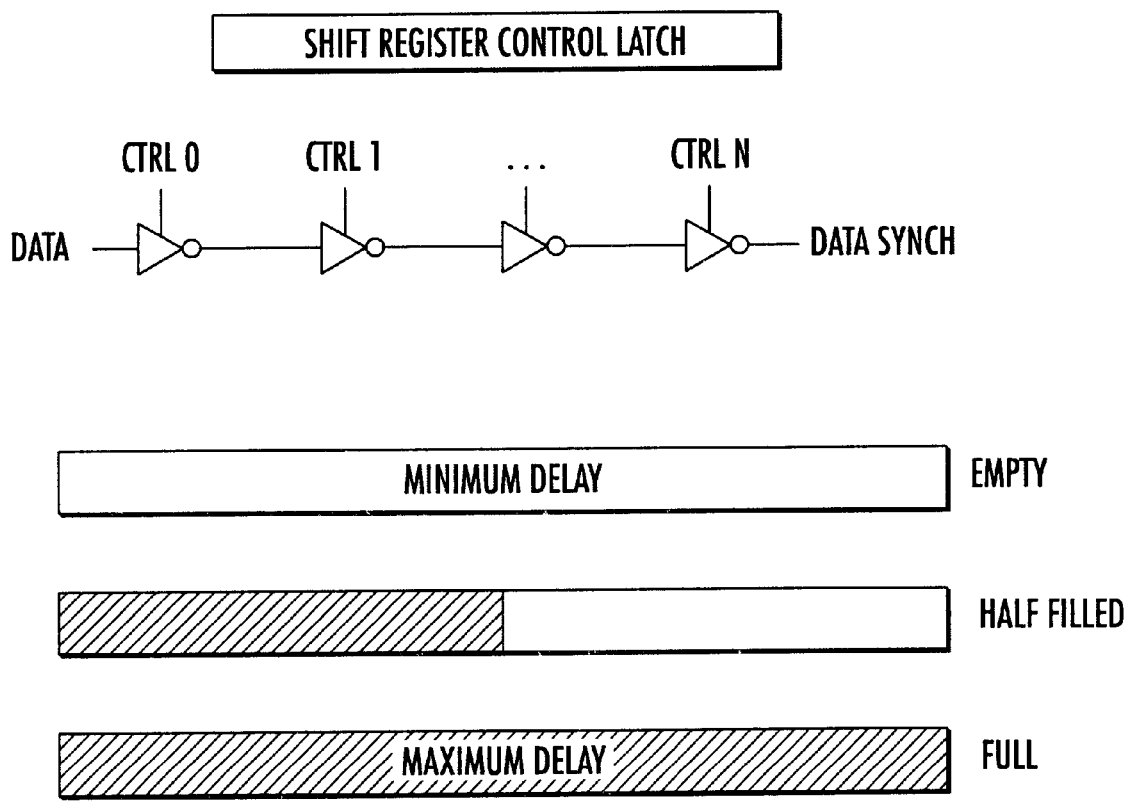
FIG. 4 illustrates the structure of the discrete delay line of the system of the invention.

The digital delay line includes a plurality of unit delay cells, whose propagation delay can assume only two values, according to the logic state of a control signal (Ctrli). When Ctrli=0, the $i^{th}$ stage produces a certain maximum delay, when Ctrli=1, a certain minimum delay. The control signal Ctrli is derived from the corresponding $i^{th}$ tap of a shift register, as depicted in FIG. 4.

At start-up, the array of control signals is set preferably to a "half saturation" condition (half filled with "1") so that the delay line has half of the cells configured to the maximum delay and the other half to the minimum delay. There can be situations where a systematic shift is known in advance. As an example, if the phase aligner is integrated on a chip. whose operating temperature is high (T junction>70° C.), but at the start of operation the temperature is low because there is no dissipation, the circuitry of the data line can have an additional delay due to an increase of temperature. This delay can be seen as a phase shift with respect to the clock edge almost fixed. This phase shift can be compensated with a proper setting of the initial state of the delay line, emptying the delay line more than one half.

By adding circuits (typically bandgap based circuits) that produce information on the actual characteristics of the process, temperature and on voltages, it is possible through digital circuits to decide on a most appropriate initial setting of the digital delay line.

A flag signal generated by the phase comparator is processed by the control circuit and eventually causes a compensation of any intervening phase drift between data and clock through an appropriate modulation of the number of max. delay cells of a first portion and correspondingly of the number of min. delay cells of the other portion of the delay line of length complementary to that of a first portion. Obviously, the process has a finite range of variation of the delay, and, hence, a corresponding finite phase shift that can be compensated. The length of the delay line, that is the total number of delay cells, is therefore a fundamental design parameter.

Figure 5:
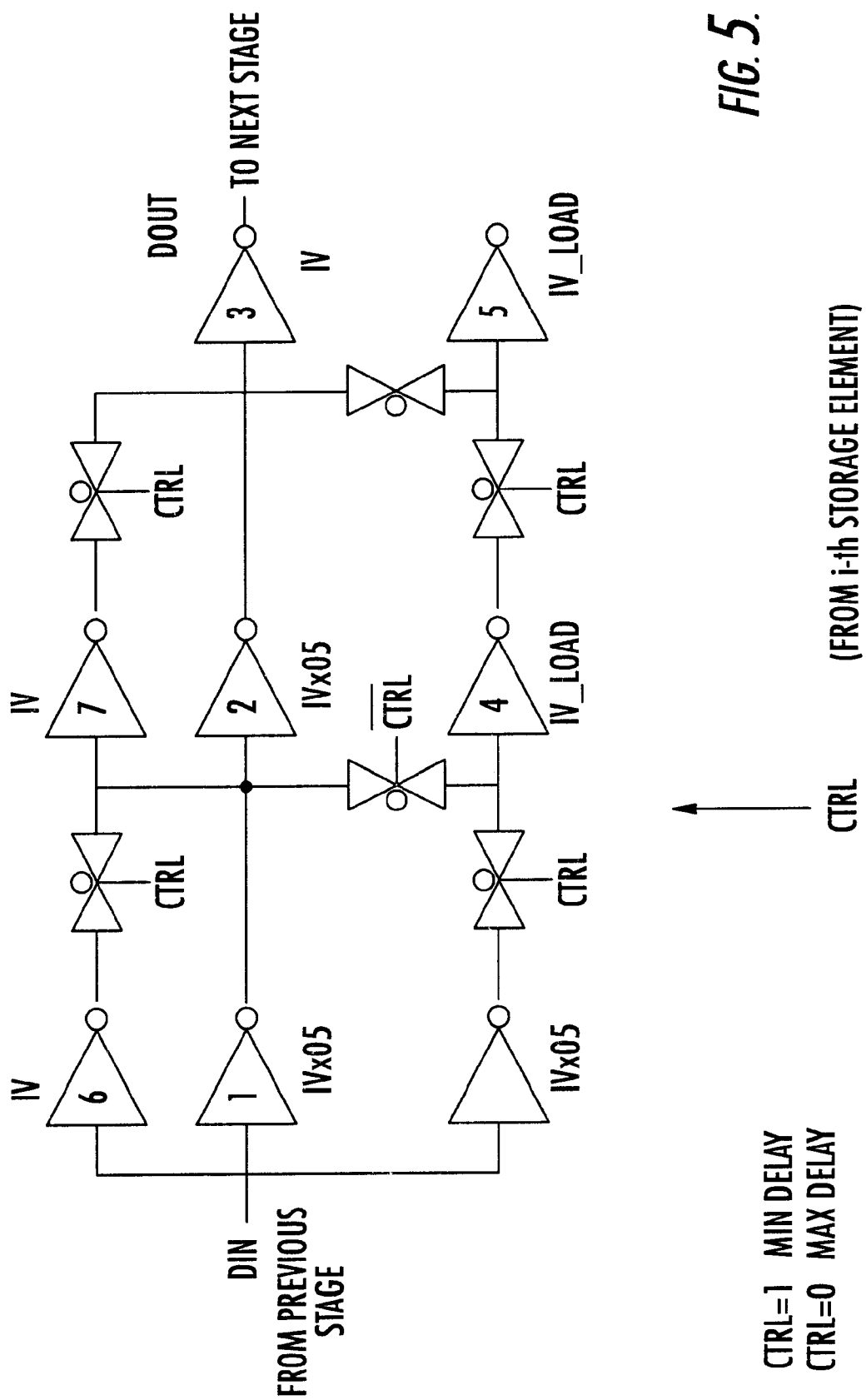
FIG. 5 shows a circuit embodiment of a single delay cell employed in the delay line of FIG. 4.

FIG. 5 shows an example of a circuit implementation of a single delay element or cell. Care must be taken in the design stage to avoid the generation of spikes on the output of a cell upon switching from a min. delay state to max. delay state.

The path between DIN (data IN) and DOUT (data OUT) through a single delay cell can be set as: CTRL=0, a high delay path through "half-drive" inverters (1,2,3) with increased load (4,5); and CTRL=1, a low delay path through "normal drive" inverters without loads (6, 7). The control circuitry properly sets unused nodes of the circuit of the delay cell in a quiescent mode.

Figure 6:
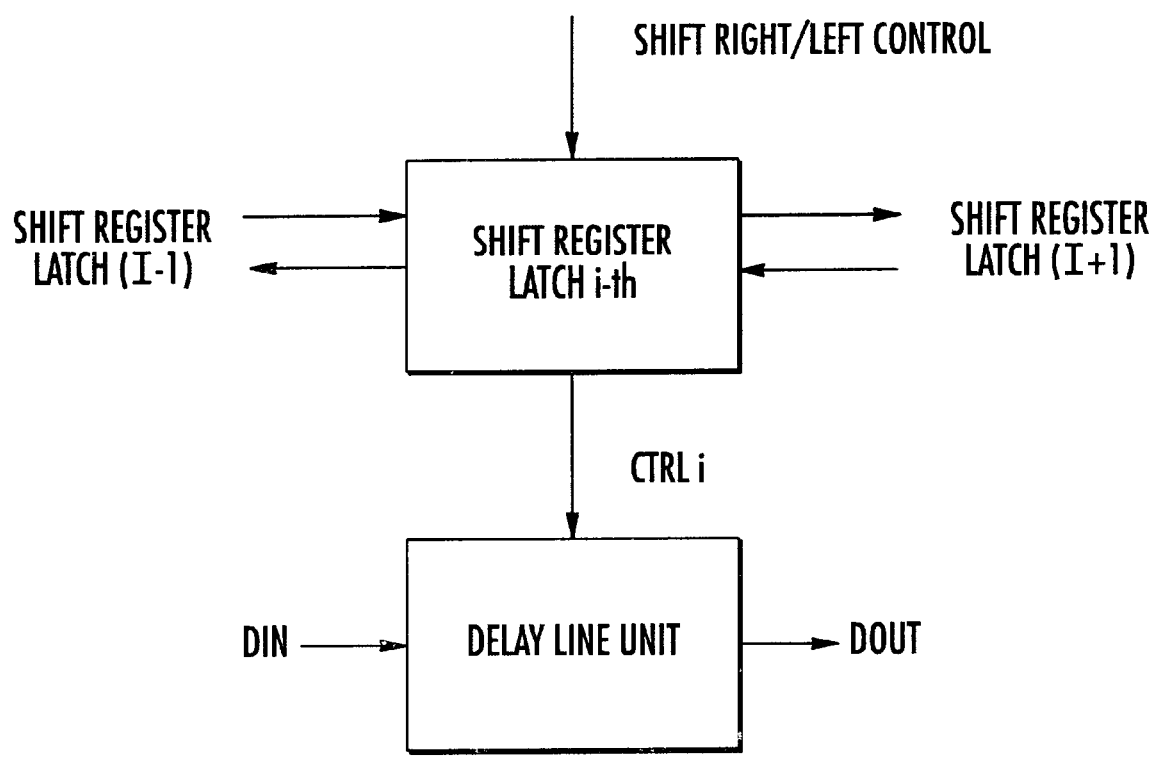
FIG. 6 shows a single delay cell and its control of the invention.

FIG. 6 depicts a unit delay cell with the relative storage element of the controlling signal (Ctrli). In consideration of the fact that the delay cells and the respective control latches are organized in form of cascaded arrays (FIG. 4) a certain amount of time elapses before any adjustment of delay becomes effective at the output of the delay line. A change of state of the logic control signal Ctrl0 of the first cell of the line must wait for the propagation time through all the cells of the delay line before affecting the output. In the meantime the system could generate a command for a change of control signals going in the opposite direction of the change of state of Ctrl0, thus assuming an oscillatory behavior.

In fact, the phase comparison between data synch, at the output of the delay line and the local clock is performed on each low-to-high transition of the data, hence every 2*Tbit interval time, that may be called T0. The result of the comparison is a flag that tells if it is necessary to delay the data with respect to the clock (increasing delay along the delay line) or anticipate the data (decreasing the amount of delay along the delay line).

Some extra time is required to adjust the total delay introduced by the delay line. Approximately the delay line will be regulated by the time T1=T0+2*Tbit. The next data edge will be delayed or anticipated, but this will appear at the output only after the propagation delay from the point where the delay update occurred (stage i-th of the delay line) to the end of the line. Assuming that this update point is close to the beginning of the line and that its propagation delay is M*Tbit (with M=10), the effects of the delay update will appear at the output at the time T2=T1+M*Tbit= 12*Tbit. Because the phase comparison can be done at every 2*Tbit interval, the system could try 6 times the same delay update, before working conditions will be changed. By supposing that only two update operations were needed to reach equilibrium, then the delay line would have moved 4 steps behind the desired setting. Therefore an opposite correction will be started, and there could be the risk of oscillating around the equilibrium setting.

Changes on the stages close to the end of the delay line will manifest themselves more readily at the output and hence these stages represent a preferred position where to tune the delay. Vice versa, changes on the first stages of the delay line strongly penalize performance. This tendency may be effectively countered by prioritizing changes of incremental delay values by way of the delay cells closer to the output of the delay line, to promote the "fastest updating" of the delay. According to a preferred embodiment of the invention this is implemented by addressing the cells of the delay line as if belonging to two distinct cascades of cells: a first or input side cascade and a second or output side cascade. The cells of the output side cascade may be seen as "fast actuators" as compared to the cells of the input side cascade that may be considered as "slow actuators".

The two cascades may then be managed by the control circuitry as follows. At start, the input side cascade and the output side cascade of the delay line are both set to a "half saturated condition". Upon an activation of the control loop, the control logic attempts to command a congruent change of state of one or more cells of the output side cascade (fast actuators). The effects of these incremental or decremental corrections are more readily produced on the data stream output by the delay line, to avoid spurious corrections (in an opposite way).

Figure 7:
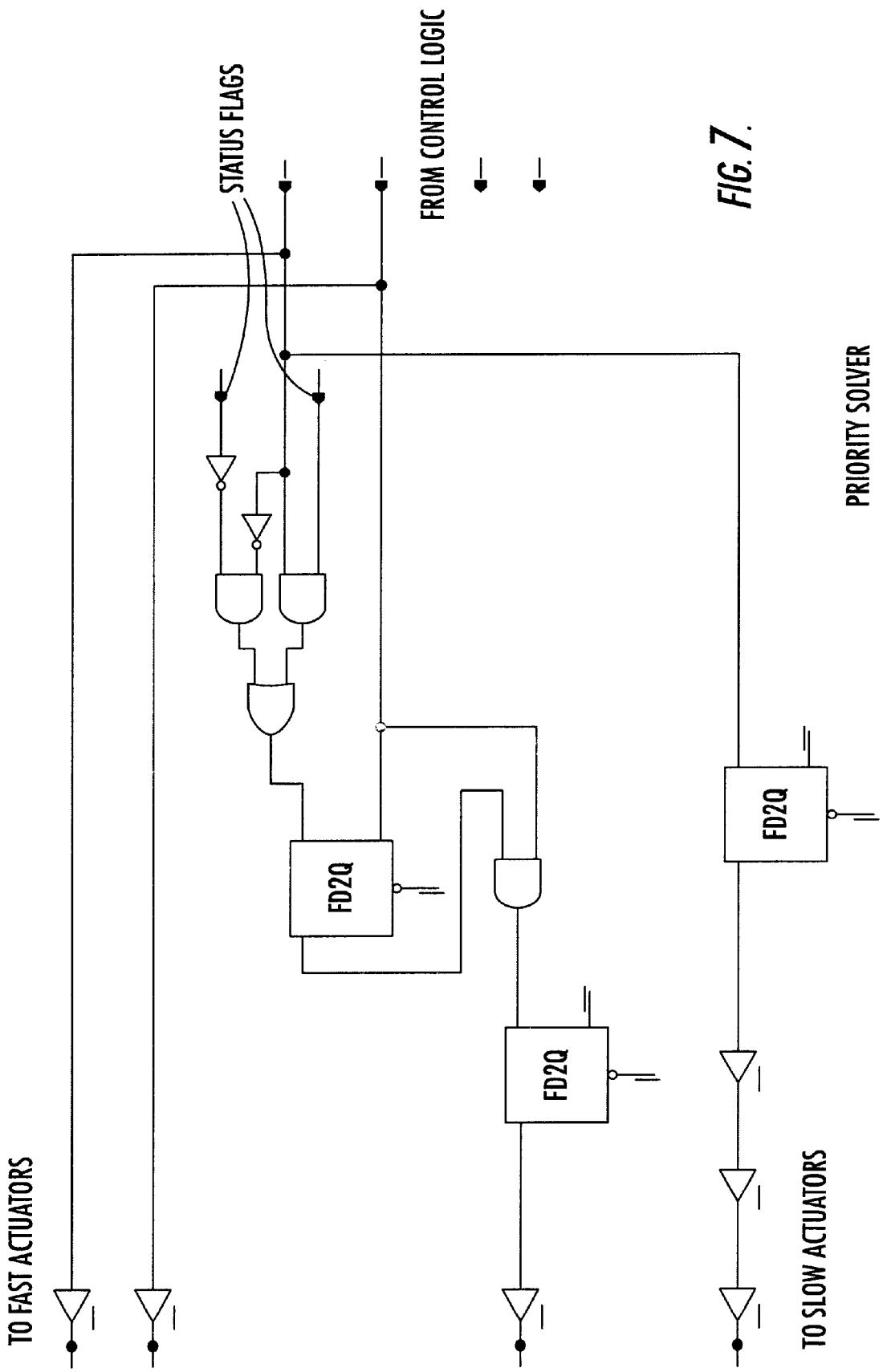
FIG. 7 is a circuit diagram for addressing a priority problem in the control circuit block of FIG. 3.

FIG. 7 shows a priority selector that implements this feature. The logic circuit implements a "priority solver" that checks the state indicators of the cells of the two cascades, and generates a flag when the necessary adjustment cannot be effected by acting on the cells of the output side cascade, and therefore must be effected by acting on the cells of the input side cascade.

If the fast tuning (output side) cascade of cells is completely "saturated" any further adjustment (in the same direction) of the delay will be effected by way of the cells of the input side cascade. By assuming, for example, that the action be a further increase of the delay, there will be some latency time before the effects of the increase will be visible at the output. The system, in the meantime, may take a new decision that will superimpose to the previous command (still in the course of execution).

If the intervening decision is for a decrease of the delay, it will be implemented in the output side cascade, whose effects are more immediate. The next decision will be based on the actual status of the delay line output irrespectively of the commanded increase that may have not yet affected the output.

Figure 8:
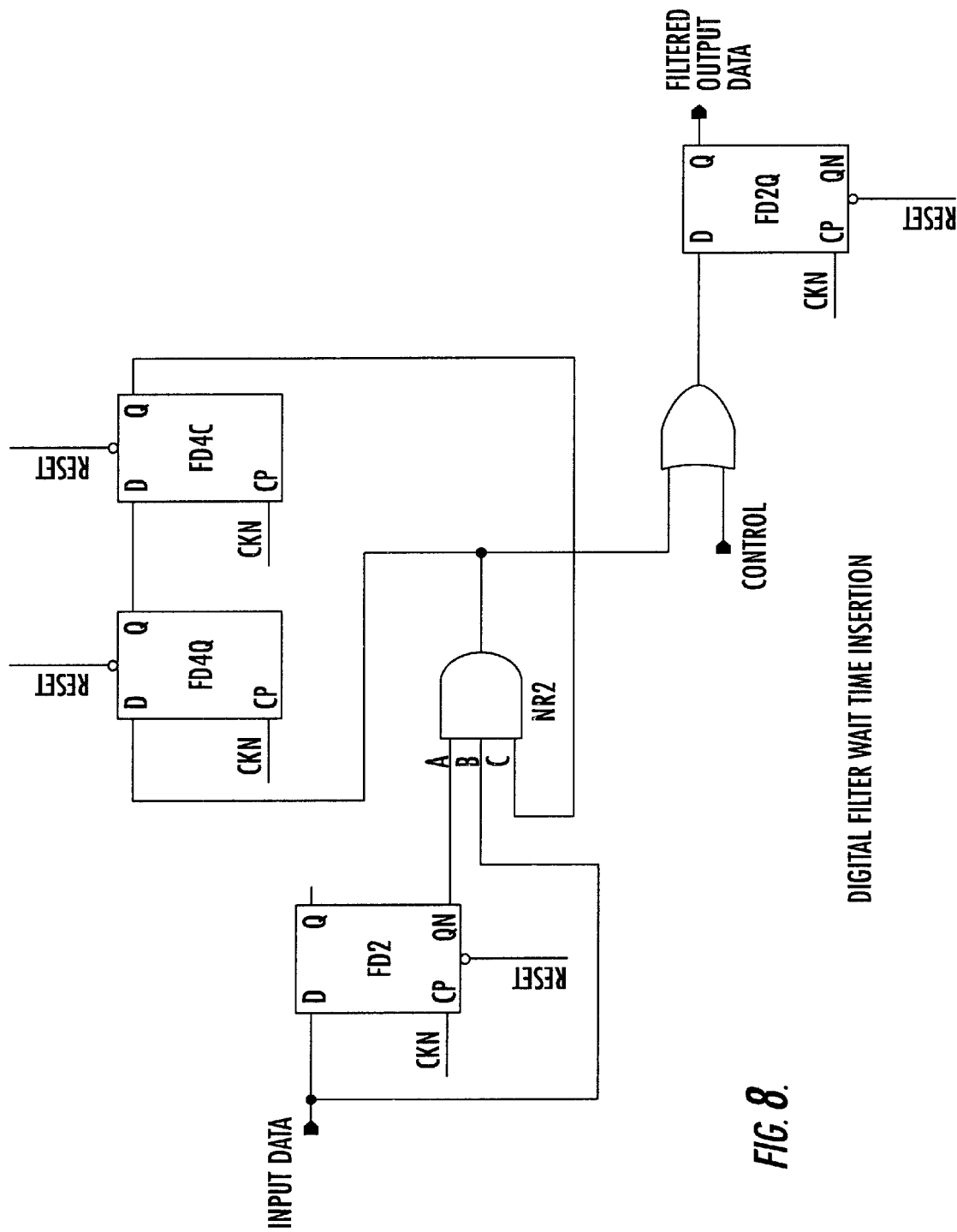
FIG. 8 is a circuit diagram of a filter employed in the control circuit block of FIG. 3.

In contrast, if this second intervening decision is again for an increase of delay, an excess delay will be spuriously added. Such an overshoot characteristic must be limited and this is done by introducing a minimum lag time between any two correction decisions. This may be implemented by using a digital filter circuit, as the one depicted in FIG. 8 in cascade of the output of the phase detector block, for introducing a wait time affecting both slow and fast correction processes.

Figure 9:
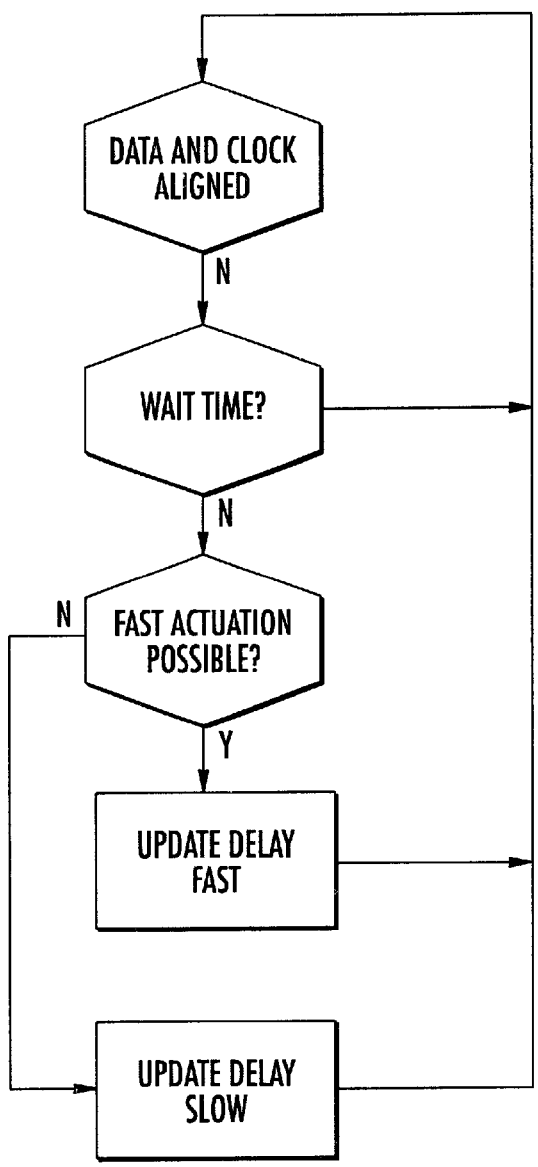
FIG. 9 is a flow chart illustrating the algorithm performed by the control logic according to a preferred embodiment.
Figure 10:
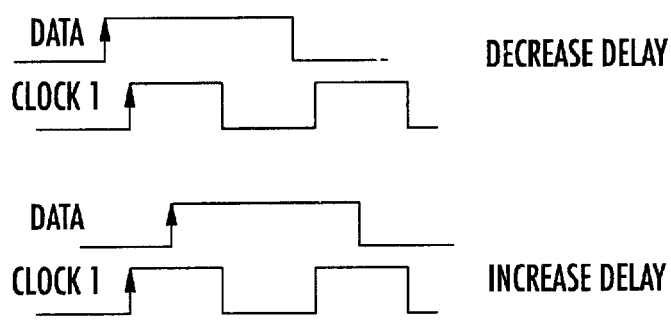
FIG. 10 illustrates the function of the phase detector block of FIG. 3.

In practice, the control logic that manages the shift register controlling the delay line, performs the algorithm illustrated in the flow diagram of FIG. 9. As depicted in FIG. 10, a mechanism that may be adopted is to check the position of the rising edge of the data with respect to the half-period high of the clock and eventually the output flag will command either an increase or a decrease of the delay introduced by the delay line.

Figure 11:
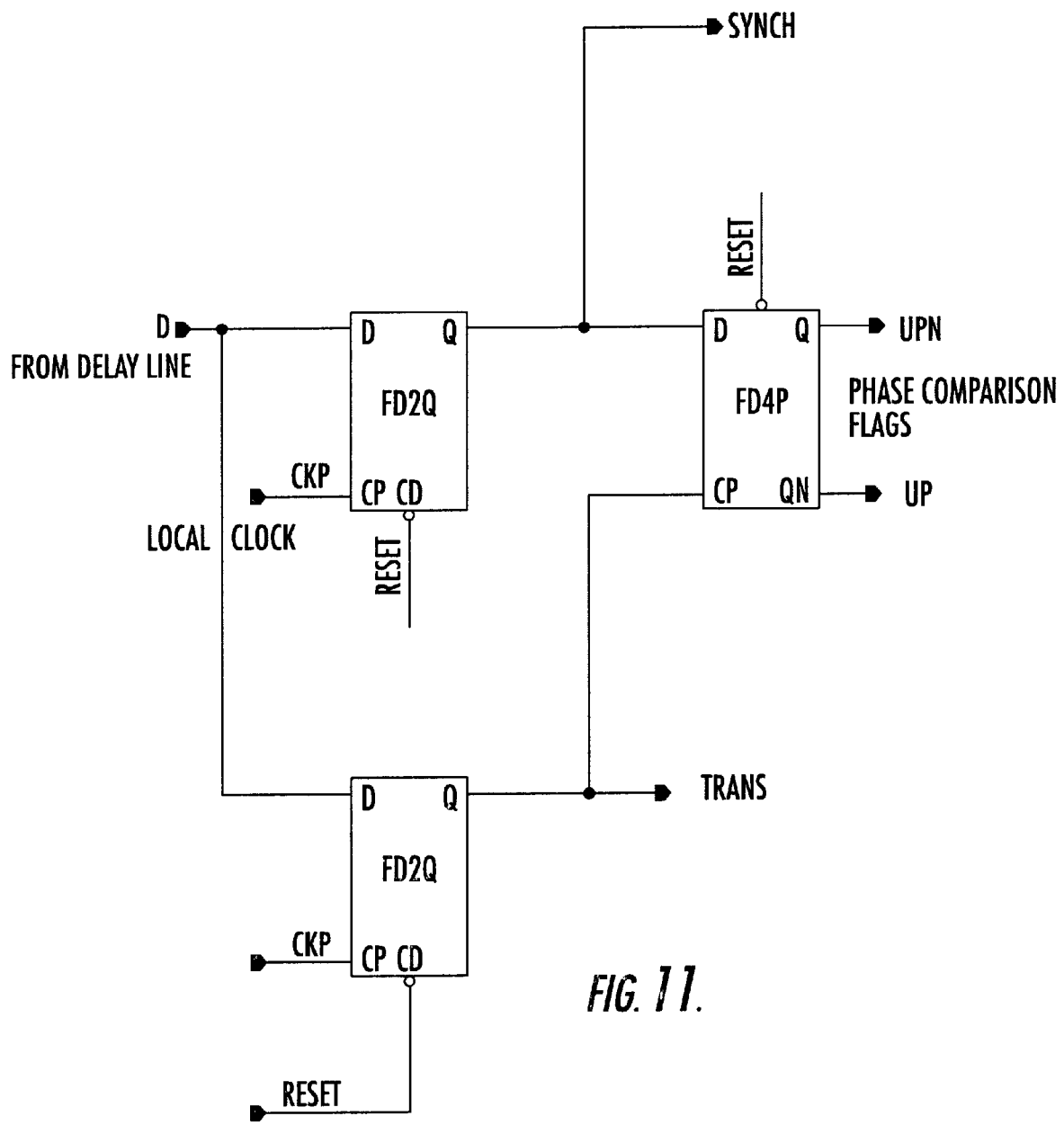
FIG. 11 shows a circuit implementation of the phase detector block of FIG. 3.

FIG. 11 shows a practical implementation of the phase detector. As already noted, the task of a digital phase detector is to output a flag that tells whether the data leads or lags the clock. This is quantized information that does not specify the value of the lead or lag tune.

Improved Phase Detector Structure

To enhance immunity to noise and prevent errors in the phase detection because of setup/hold violations, a multiple check may be implemented on a plurality of incrementally delayed samples of the data that may be produced with common logic gates. The absolute value of the incremental delays is not important. The function of this multiple phase check is to introduce some redundancy in the phase detection. Because of the limited number of gates that make up a phase detector and of the limited amount of extra logic necessary to generate the delayed samples, the burden from the point of view of a gate count is negligible.

Figure 12:
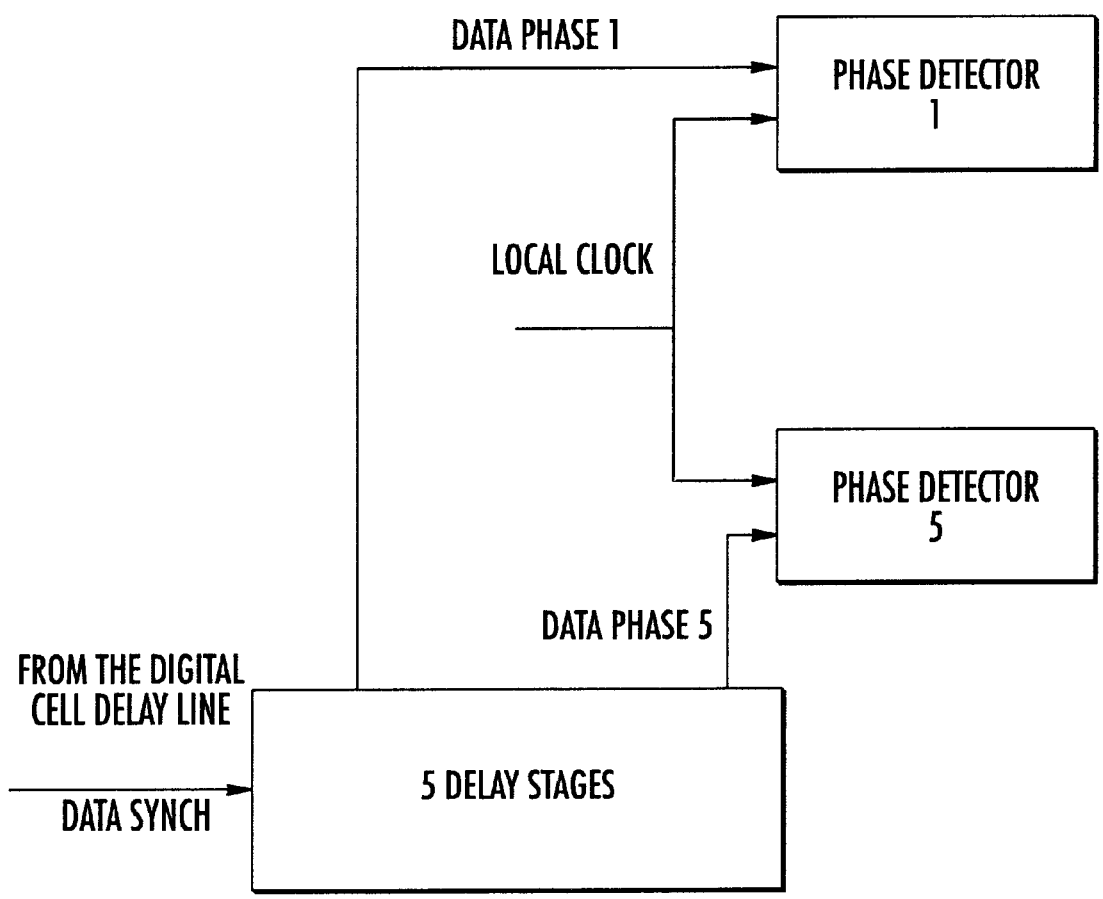
FIG. 12 shows an enhanced performance phase detector according to an alternative embodiment.
Figure 13:
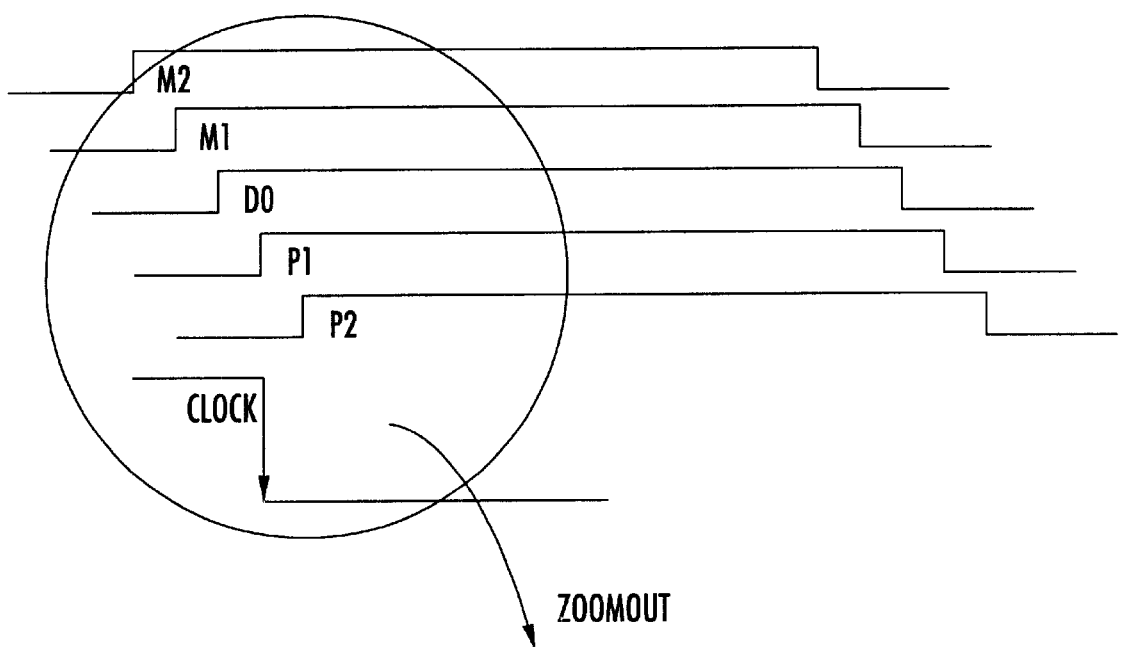
FIG. 13 illustrates the phase comparison function performed according to the alternative embodiment and the relative diagram.
Figure 13:
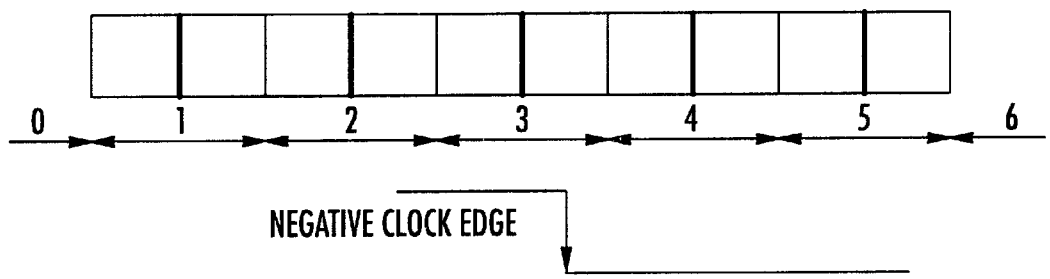

FIGS. 12 and 13 provide a hardware scheme and a diagrammatic illustration of such a reiteration of the phase detection on five, purposely delayed, samples of data. FIG. 13 includes a "zoom-out" of the possible ranges where the falling edge of the clock can fall. The output of the array of five phase comparators and the most suitable data phase for sampling determined therefrom are indicated in the following truth-table.

TABLE 1

Phase detector truth table

| 0 | 00000 | M2 | −DELAY |
|---|---|---|---|
| 1 | x0000 | M2 | −DELAY |
|   | xx000 | M2/M1 | −DELAY |
| 2 | 1x000 | M1 | −DELAY |
|   | 1xx00 | M1/D0 | −DELAY |
| 3 | 11x00 | D0 | — |
|   | 11xx0 | D0/P1 | +DELAY |
| 4 | 111x0 | P1 | +DELAY |
|   | 111xx | P1/P2 | +DELAY |
| 5 | 1111x | P2 | +DELAY |
|   | 11111 | P2 | +DELAY |

The first column of the truth table indicates the region of occurrence of a falling edge, the second column contains the output code of the relative phase detector, 0 means that the half-period high of the clock lags data and 1 that it leads the data. The third column indicates the most suitable data phase and the fourth column shows the flag that is processed by the control logic for managing the delay. For example if the negative edge of the clock falls in the region 0, it is evident that the required action is to consider the delayed data phase M2 as the most likely to be correctly sampled, and, therefore, the delay line should reduce the delay introduced.

Control Logic

This block manages the timing of the delay introduced by the delay line as a function of the flag produced by the phase comparator. It is a Finite State machine that implements the truth table of Table 1 and drives the shift register that controls the delay cells of the delay line.

Resynchronization

This block gets the information of the appropriate data phase (for the last embodiment considered of the five avoidable) from the phase detector block, samples it and multiplexes it to the output.

Phase Aligner with Extended Phase Recovery

A digital phase aligner as described above places a limit to the amount of phase shift between the clock and the data that is correctable. However, many advanced applications have data and clock signals of the same rate. The requirement of these links may be that of an extended phase shift accommodation to cope with process, temperature, and supply voltage spreads and different data path lengths.

Theoretically, the delay line could be lengthened to accommodate the maximum expected phase shift. However, the longer the delay line, the greater becomes the power consumption and the longer becomes the latency time of the data through the delay line path to be accounted for.

Figure 14:
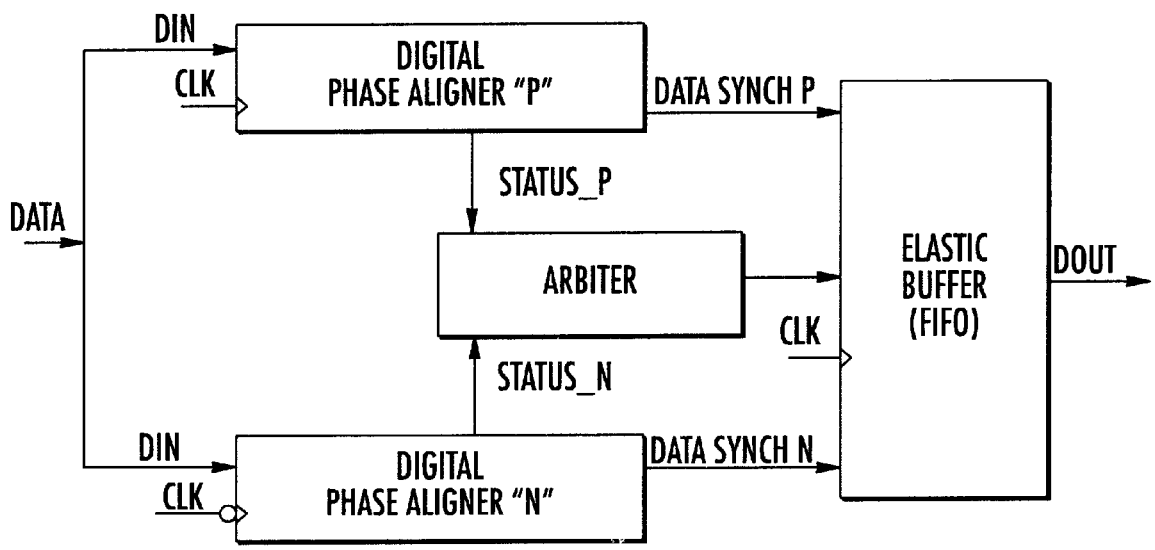
FIG. 14 is a basic diagram of an aligner block employing two aligners whose function is coordinated by an arbiter circuit and FIFO buffer for relaxing the constraints for extremely high frequency applications.

Under particularly demanding conditions, an efficient extension of the basic phase aligner of the invention may include a discrete phase shift recovery mechanism. The approach is to recover any phase jump in excess of ±2 p by using an elastic buffer in the form of a first-in-first-out (FIFO) buffer. The approach is that the phase aligner should automatically perform a phase jump of ±2 p whenever the delay line has reached a saturated stage (all the cells either in one or the other state). FIG. 14 is a diagram of such an extended phase aligner embodiment.

Two independent phase aligners, each working on the opposite edges of the local clock edge, are used in conjunction with an elastic buffer (FIFO) controlled by an arbiter circuit (ARBITER). The functioning of the extended phase aligner of FIG. 14 may be described by assuming the following initial conditions after reset: both phase aligner delay lines are in a "half saturation" condition; the arbiter logic selects phase aligner "P"; and the Read and Write pointers of the FIFO buffer are spaced by a half of the total FIFO length.

Figure 15:
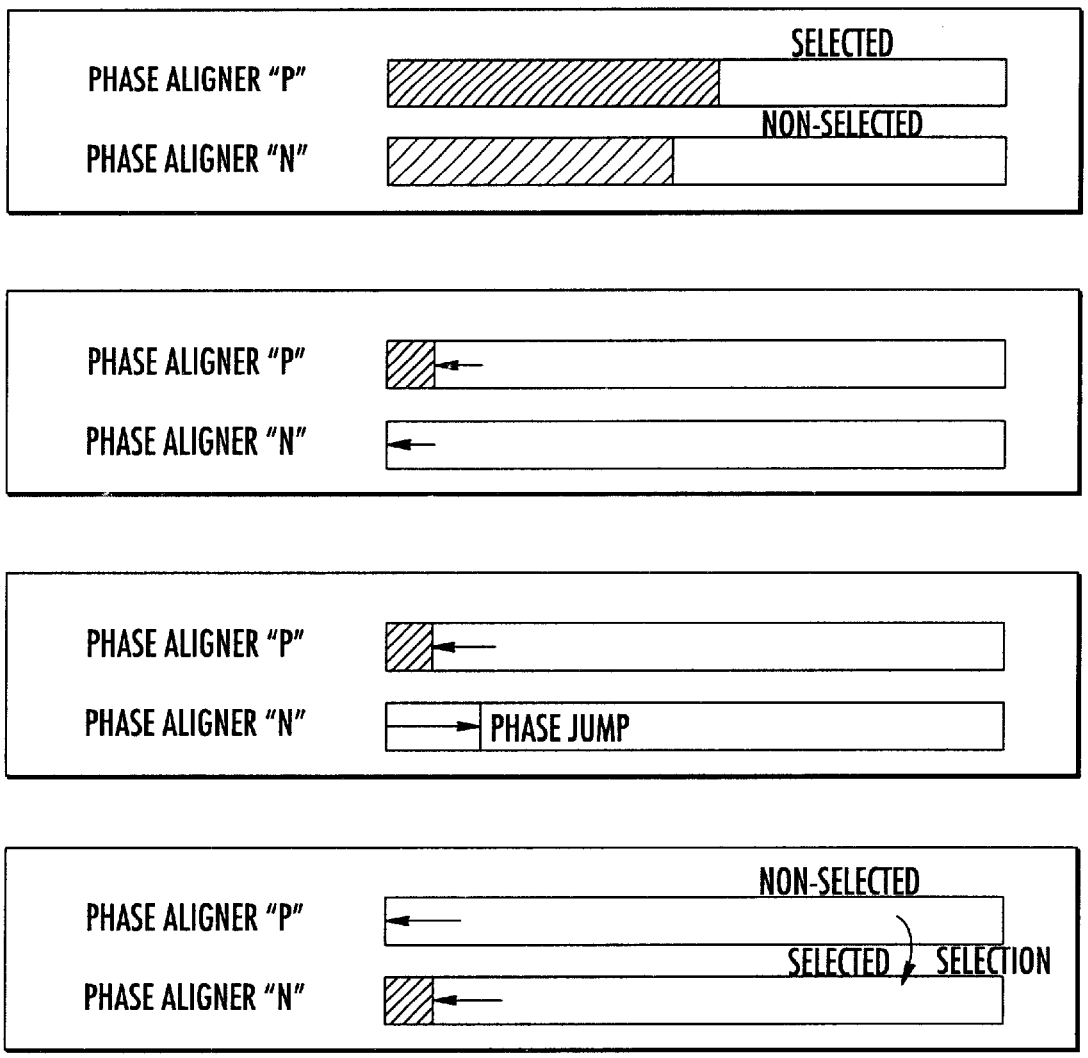
FIG. 15 depicts various conditions of operation of the system of FIG. 14.

After reset, the two delay lines set their delays very close to each other (the difference corresponding to half a clock period). In case of a positive Data-Clk phase drift, the delay lines will react, as depicted in the four diagrams of FIG. 15, decreasing the delay and the phase aligner "N" will eventually reach its lowest value.

Should the phase drift persist, the system will operate an automatic phase jump of exactly 2p as described earlier. No data bits will be lost at this point, because the phase jump has occurred in the deselected phase aligner.

Therefore, when "P" reaches its bottom, "N" has already jumped and is in a safe condition and in the right. The arbiter then selects the "N" phase aligner and instructs the elastic buffer to take into account a π phase jump. The same will happen when "N" is selected and reaches its limit capacity.

In practice, whenever a selected delay line reaches a limit of its capacity, a phase jump in the opposite direction is put into effect by the arbiter circuit, by reversing the selection of the delay line and conditioning the FIFO buffer. To recover ±π phase jump without the tight timing constraints of working with both CLK edges, an additional n phase shift may be imparted to the output of the phase aligner "P", so that both the arbiter and the elastic buffer can work on rising edges of the clock.

The arbiter functionality may be defined as follows: when the selected phase aligner (P.A.) reaches the bottom (top) of its capacity, the other phase aligner (P.A.) is selected, waiting until the first P.A. exits from a bottom (top) condition, eventually, instructing the elastic buffer to lose (gain) 1 data sample in case the control switches from the "N" P.A. to the "P" P.A. or "P" to "N".

Due to the high-frequency constraint, the elastic buffer may be implemented by a shift register wherein the data are introduced corresponding to the write pointer. The write pointer is initially set to half of the FIFO capacity, to allow for ½ FIFO capacity phase jump recovery.

Figure 16:
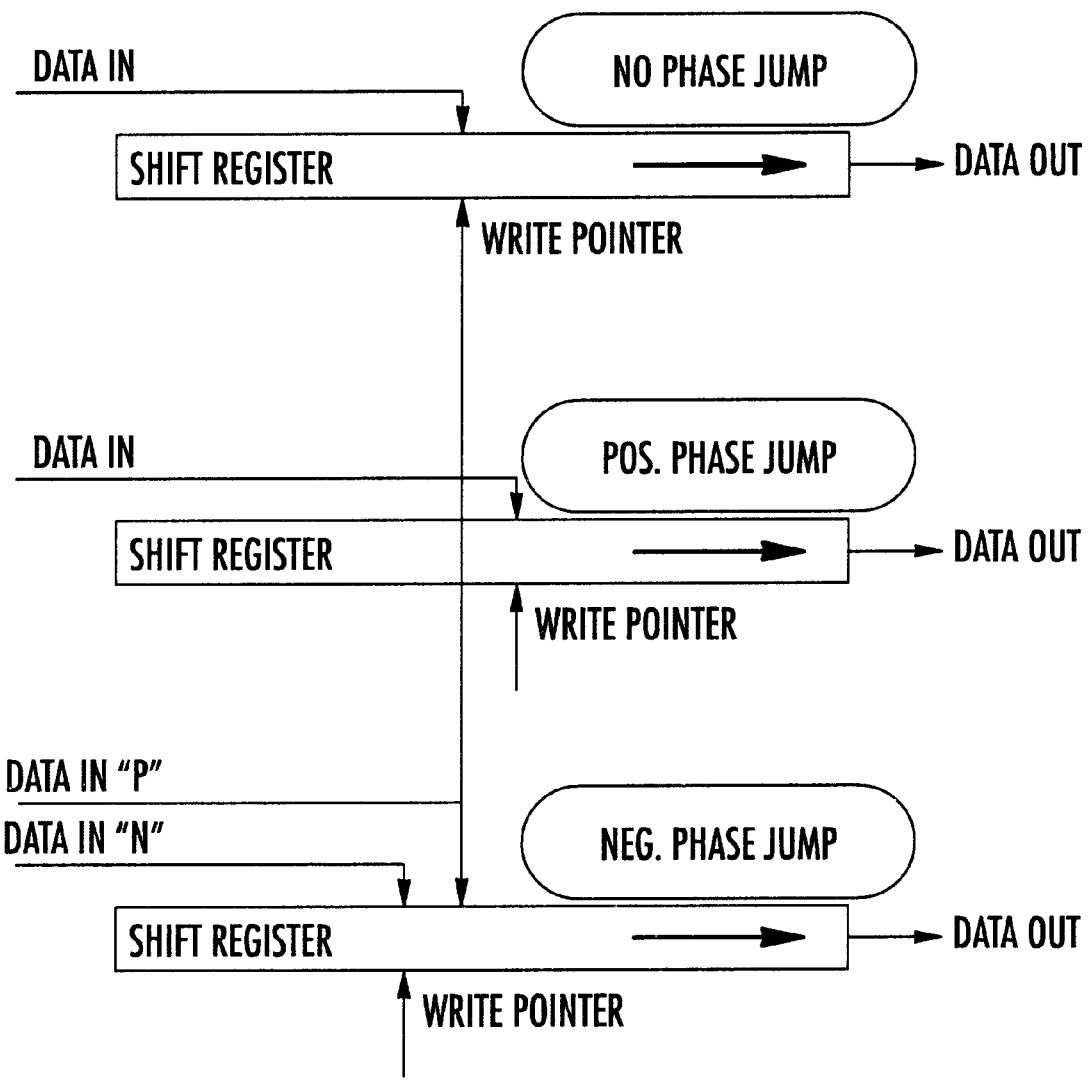
FIG. 16 illustrates the data management in case of a phase jump.

As illustrated in FIG. 16, in case of no phase jump, the write pointer is not moved (the data coming from the selected P.A. is introduced in the current position). In case of a positive phase jump, the write pointer is increased, and the new data is introduced in the future position. In case of a negative phase jump, the "P" data is introduced in the current position, and the write pointer is decreased and the "N" data is introduced in the future position of the write pointer.

The advantage of this approach is to ensure a relatively fast elastic buffer and a relatively low power consumption (the write pointer and half of the shift register are clocked, but no data run through). The output data is delivered without any undue delay. Another significant advantage is the modularity of the approach: no limit is set to the fifo length, and, hence, to the phase shift recovery capability.

What is claimed is:

1. A phase aligner in the form of an all-digital control loop and comprising:
    a digital delay line having an input coupled to an incoming data stream and outputting a delayed data stream, said digital delay line comprising a plurality of delay cells arranged in at least one cascade with each cell being individually configurable to produce a selectable propagation delay as a function of a logic state of a respective digital control signal;
    a digital phase detector discriminating on a phase lead or lag between a clock signal and the delayed data stream from said digital delay line;
    a digital state machine defining a loop filter coupled to an output of said digital phase detector for checking oscillatory behavior of the control loop;
    a digital delay line control circuit regulating the delay introduced by said digital delay line, said digital delay line control circuit comprising a shift register including a plurality of latches equal to a number of delay cells, each latch having an output tap controlling a respective delay cell; and
    a digital output circuit receiving the delayed data stream from said digital delay line and outputting a logic bitstream of information congruent with information content of the incoming data stream.

2. A phase aligner according to claim 1, wherein said at least one cascade comprises an output side cascade of delay cells and an input side cascade of delay cells, the cells of the output side being prioritarily switched to a different state for fast updating a total delay, and the cells of the input side being switched to a different state after exhausting delay adjustment capabilities of said prioritarily acted upon delay cells.

3. A phase aligner according to claim 1, wherein the at least one cascade comprises a plurality of cascades; and wherein at start up each cascade is in a half saturation condition.

4. A phase aligner according to claim 1, wherein the at least one cascade comprises a plurality of cascades; and wherein at start up each cascade is placed in a predetermined condition of saturation defined as a function of predetermined parameters.

5. A phase aligner according to claim 2, wherein said digital delay line control circuit performs the following algorithm, upon receiving a new flag signal indicating a misalignment generated by said digital phase detector:
    verifying elapsing of a preestablished minimum interval of time from a last occurred flag signal, and ignoring the new flag signal if such a minimum interval of time has not yet elapsed; and
    upon validating the new flag signal, then checking a state of saturation of the output side cascade: if not fully saturated for a required delay adjustment, commanding one or more cells of said output side cascade to a state congruent with a required incremental increase or decrease of delay based upon a logic state of the new flag signal; and if fully saturated, commanding a change of state of one or more delay cells of said input side cascade congruent with a required increment or decrement of the delay based upon the logic state of the new flag signal.

6. A phase aligner according to claim 1, wherein said digital phase detector is duplicated a predetermined number of times, each individual digital phase detector sensing a purposely delayed data sample stream thereby introducing redundancy in discrimination.

7. A phase aligner according to claim 6, further comprising processing logic circuitry selecting a most favorable data phase of incrementally delayed data streams and a direction of adjustment of the delay introduced by said digital delay line.

8. A phase aligner according to claim 1, wherein each delay cell has two selectable propagation delays.

9. A phase aligner comprising:
    a delay line having an input coupled to an incoming data stream and outputting a delayed data stream, said delay line comprising a plurality of delay cells arranged in at least one cascade with each cell being individually configurable to produce a selectable propagation delay as a function of a logic state of a respective digital control signal;
    a phase detector discriminating on a phase lead or lag between a clock signal and the delayed data stream from said delay line;
    a state machine defining a loop filter coupled to an output of said phase detector for checking oscillatory behavior;
    a delay line control circuit regulating the delay introduced by said delay line, said delay line control circuit comprising a shift register including a plurality of latches, each latch having an output tap controlling a respective delay cell; and
    an output circuit receiving the delayed data stream from said delay line and outputting a logic bitstream of information congruent with information content of the incoming data stream.

10. A phase aligner according to claim 9, wherein each of said delay line, phase detector, state machine, and delay line control circuit comprises a digital circuit.

11. A phase aligner according to claim 9, wherein said at least one cascade comprises an output side cascade of delay cells and an input side cascade of delay cells, the cells of the output side being prioritarily switched to a different state for fast updating a total delay, and the cells of the input side being switched to a different state after exhausting delay adjustment capabilities of said prioritarily acted upon delay cells.

12. A phase aligner according to claim 9, wherein the at least one cascade comprises a plurality of cascades; and wherein at start up each cascade is in a half saturation condition.

13. A phase aligner according to claim 9, wherein the at least one cascade comprises a plurality of cascades; and wherein at start up each cascade is placed in a predetermined condition of saturation defined as a function of predetermined parameters.

14. A phase aligner according to claim 11, wherein said delay line control circuit performs the following algorithm, upon receiving a new flag signal indicating a misalignment generated by said phase detector:

verifying elapsing of a preestablished minimum interval of time from a last occurred flag signal, and ignoring the new flag signal if such a minimum interval of time has not yet elapsed; and upon validating the new flag signal, then checking a state of saturation of the output side cascade: if not fully saturated for a required delay adjustment, commanding one or more cells of said output side cascade to a state congruent with a required incremental increase or decrease of delay based upon a logic state of the new flag signal; and if fully saturated, commanding a change of state of one or more delay cells of said input side cascade congruent with a required increment or decrement of the delay based upon the logic state of the new flag signal.

15. A phase aligner according to claim 9, wherein said phase detector is duplicated a predetermined number of times, each individual phase detector sensing a purposely delayed data sample stream thereby introducing redundancy in discrimination.

16. A phase aligner according to claim 15, further comprising processing logic circuitry selecting a most favorable data phase of incrementally delayed data streams and a direction of adjustment of the delay introduced by said delay line.

17. A phase aligner according to claim 9, wherein each delay cell has two selectable propagation delays.

18. A phase alignment circuit comprising:

a pair of phase aligners functioning in parallel and on different clock edges;

an elastic buffer receiving outputs of said pair of phase aligners and outputting an aligned logic bitstream;

a logic arbiter circuit selecting alternatively one or other of said pair of phase aligners whenever a currently selected phase aligner reaches a limit of phase adjustment capability for automatically implementing a n phase shift, thereby expanding a range of compensatable phase drift;

each phase aligner comprising a delay line having an input coupled to an incoming data stream and outputting a delayed data stream, said delay line comprising a plurality of delay cells arranged in at least one cascade with each cell being individually configurable to produce a selectable propagation delay as a function of a logic state of a respective digital control signal, a phase detector discriminating on a phase lead or lag between a clock signal and the delayed data stream from said delay line, a state machine defining a loop filter coupled to an output of said phase detector for checking oscillatory behavior, a delay line control circuit regulating the delay introduced by said delay line, said delay line control circuit comprising a shift register including a plurality of latches, each latch having an output tap controlling a respective delay cell, and an output circuit receiving the delayed data stream from said delay line and outputting a logic bitstream of information congruent with information content of the incoming data stream.

19. A phase alignment circuit according to claim 18, wherein each of said delay line, phase detector, state machine, and delay line control circuit comprises a digital circuit.

20. A phase alignment circuit according to claim 18, wherein said at least one cascade comprises an output side cascade of delay cells and an input side cascade of delay cells, the cells of the output side being prioritarily switched to a different state for fast updating a total delay, and the cells of the input side being switched to a different state after exhausting delay adjustment capabilities of said prioritarily acted upon delay cells.

21. A phase alignment circuit according to claim 18, wherein the at least one cascade comprises a plurality of cascades; and wherein at start up each cascade is in a half saturation condition.

22. A phase alignment circuit according to claim 18, wherein the at least one cascade comprises a plurality of cascades; and wherein at start up each cascade is placed in a predetermined condition of saturation defined as a function of predetermined parameters.

23. A phase alignment circuit according to claim 20, wherein said delay line control circuit performs the following algorithm, upon receiving a new flag signal indicating a misalignment generated by said phase detector:

verifying elapsing of a preestablished minimum interval of time from a last occurred flag signal, and ignoring the new flag signal if such a minimum interval of time has not yet elapsed; and upon validating the new flag signal, then checking a state of saturation of the output side cascade: if not fully saturated for a required delay adjustment, commanding one or more cells of said output side cascade to a state congruent with a required incremental increase or decrease of delay based upon a logic state of the new flag signal; and if fully saturated, commanding a change of state of one or more delay cells of said input side cascade congruent with a required increment or decrement of the delay based upon the logic state of the new flag signal.

24. A phase alignment circuit according to claim 18, wherein said phase detector is duplicated a predetermined number of times, each individual phase detector sensing a purposely delayed data sample stream thereby introducing redundancy in discrimination.

25. A phase alignment circuit according to claim 24, further comprising processing logic circuitry selecting a most favorable data phase of incrementally delayed data streams and a direction of adjustment of the delay introduced by said delay line.

26. A phase alignment circuit according to claim 18, wherein each delay cell has two selectable propagation delays.

27. A method for phase alignment comprising the steps of:

coupling an input of a delay line to an incoming data stream and outputting a delayed data stream, the delay line comprising a plurality of delay cells arranged in at least one cascade with each cell being individually configurable to produce a selectable propagation delay as a function of a logic state of a respective digital control signal;

discriminating on a phase lead or lag between a clock signal and the delayed data stream from the delay line using a phase detector;

checking oscillatory behavior using a state machine defining a loop filter coupled to an output of the phase detector;

regulating delay introduced by the delay line using a shift register including a plurality of latches with each latch having an output tap controlling a respective delay cell; and receiving the delayed data stream from the delay line and outputting a logic bitstream of information congruent with information content of the incoming data stream.

28. A method according to claim 27, wherein each of the delay line, phase detector, and state machine comprises a digital circuit.

29. A method according to claim 27, wherein the at least one cascade comprises an output side cascade of delay cells and an input side cascade of delay cells; and further comprising the steps of prioritarily switching the cells of the output side to a different state for fast updating a total delay, and switching the cells of the input side to a different state after exhausting delay adjustment capabilities of the prioritarily acted upon delay cells.

30. A method according to claim 27, wherein the at least one cascade comprises a plurality of cascades; and further comprising the step of setting at start up each cascade in a half saturation condition.

31. A method according to claim 27, wherein the at least one cascade comprises a plurality of cascades; and further comprising the step of setting at start up each cascade in a predetermined condition of saturation defined as a function of predetermined parameters.

32. A method according to claim 29, wherein the step of regulating the delay uses the following algorithm, upon receiving a new flag signal indicating a misalignment generated by the phase detector:

verifying elapsing of a preestablished minimum interval of time from a last occurred flag signal, and ignoring the new flag signal if such a minimum interval of time has not yet elapsed; and upon validating the new flag signal, then checking a state of saturation of the output side cascade: if not fully saturated for a required delay adjustment, commanding one or more cells of the output side cascade to a state congruent with a required incremental increase or decrease of delay based upon a logic state of the new flag signal; and if fully saturated, commanding a change of state of one or more delay cells of the input side cascade congruent with a required increment or decrement of the delay based upon the logic state of the new flag signal.

* * * * *